US009436220B2

(12) United States Patent
Rosenberg et al.

(10) Patent No.: US 9,436,220 B2
(45) Date of Patent: Sep. 6, 2016

(54) SYSTEM AND METHOD FOR MOBILE DEVICE DOCKING STATION

(75) Inventors: Nicholas Kim Rosenberg, Caterham (GB); Richard John Carey, Billericay (GB)

(73) Assignee: JPMorgan Chase Bank, N.A., New York, NY (US)

( * ) Notice: Subject to any disclaimer, the term of this patent is extended or adjusted under 35 U.S.C. 154(b) by 860 days.

(21) Appl. No.: 13/524,630

(22) Filed: Jun. 15, 2012

(65) Prior Publication Data
US 2014/0059263 A1 Feb. 27, 2014

Related U.S. Application Data

(60) Provisional application No. 61/642,916, filed on May 4, 2012.

(51) Int. Cl.
*G06F 13/00* (2006.01)
*G06F 1/16* (2006.01)

(52) U.S. Cl.
CPC .................. *G06F 1/1632* (2013.01)

(58) Field of Classification Search
CPC ............... H04W 4/008; G06F 1/1632
USPC .................................. 710/303
See application file for complete search history.

(56) References Cited

U.S. PATENT DOCUMENTS

| 5,864,708 | A | 1/1999 | Croft et al. |
| 5,933,812 | A | 8/1999 | Meyers |
| 5,940,767 | A | 8/1999 | Bourgeois |
| 6,766,175 | B2 | 7/2004 | Uchiyama |
| 6,978,154 | B1 * | 12/2005 | Ospalak et al. ............... 455/557 |
| 7,072,675 | B1 | 7/2006 | Kanakubo |
| 7,076,270 | B2 | 7/2006 | Jaggers et al. |
| D629,404 | S | 12/2010 | Wu |
| 8,117,314 | B2 | 2/2012 | Croft et al. |
| 8,254,992 | B1 * | 8/2012 | Ashenbrenner et al. ...... 455/557 |
| 8,294,417 | B2 | 10/2012 | Kaye |
| 8,296,453 | B1 | 10/2012 | Margulis |
| 8,321,922 | B1 | 11/2012 | Lo et al. |
| 8,374,157 | B2 | 2/2013 | Tamir et al. |
| 8,472,436 | B2 | 6/2013 | Meiri et al. |
| 8,494,576 | B1 | 7/2013 | Bye et al. |
| 8,701,174 | B1 * | 4/2014 | Dotan ................... H04L 9/3228 709/203 |
| 2002/0032875 | A1 * | 3/2002 | Kashani ................... 713/300 |
| 2004/0129522 | A1 * | 7/2004 | Skowronski ............ 191/12.2 R |
| 2004/0160363 | A1 * | 8/2004 | Powers ................. H04W 64/00 342/430 |
| 2005/0162824 | A1 * | 7/2005 | Thompson ................. 361/686 |
| 2006/0159158 | A1 * | 7/2006 | Moore et al. ................ 375/130 |
| 2006/0219776 | A1 | 10/2006 | Finn |
| 2007/0035917 | A1 * | 2/2007 | Hotelling et al. ............ 361/683 |
| 2007/0057911 | A1 * | 3/2007 | Fateh .................... G06F 1/1626 345/156 |
| 2010/0039066 | A1 | 2/2010 | Yuan et al. |

(Continued)

FOREIGN PATENT DOCUMENTS

EP 0809174 11/1997
EP 2495941 9/2012

(Continued)

*Primary Examiner* — Faisal M Zaman
(74) *Attorney, Agent, or Firm* — Goodwin Procter LLP

(57) ABSTRACT

Embodiments of the invention are related to systems and methods for a docking station that wirelessly connects to a mobile device, facilitates charging the mobile device, and enables the mobile device to interact with a virtual desktop infrastructure.

37 Claims, 7 Drawing Sheets

(56) References Cited

U.S. PATENT DOCUMENTS

| | | | |
|---|---|---|---|
| 2010/0078343 A1* | 4/2010 | Hoellwarth et al. | 206/320 |
| 2010/0146308 A1* | 6/2010 | Gioscia et al. | 713/300 |
| 2010/0250818 A1 | 9/2010 | Gill | |
| 2010/0268831 A1 | 10/2010 | Scott | |
| 2011/0098087 A1* | 4/2011 | Tseng | 455/557 |
| 2011/0209064 A1* | 8/2011 | Jorgensen | G06F 9/4445 715/733 |
| 2012/0030579 A1* | 2/2012 | Morard | H04L 12/1822 715/740 |
| 2012/0066607 A1* | 3/2012 | Song | G06F 9/5077 715/737 |
| 2012/0078720 A1* | 3/2012 | Pappas | G06F 8/38 705/14.55 |
| 2012/0084381 A1* | 4/2012 | Alladi | G06F 9/544 709/213 |
| 2012/0084570 A1* | 4/2012 | Kuzin | G06F 21/41 713/182 |
| 2012/0185528 A1* | 7/2012 | Jaudon | G06F 9/54 709/203 |
| 2012/0246374 A1* | 9/2012 | Fino | 710/303 |
| 2012/0282858 A1 | 11/2012 | Gill | |
| 2012/0303476 A1* | 11/2012 | Krzyzanowski | G06F 8/60 705/26.5 |
| 2013/0031377 A1 | 1/2013 | Sultenfuss | |
| 2013/0086633 A1* | 4/2013 | Schultz | 726/2 |
| 2013/0093220 A1* | 4/2013 | Pajic | 297/163 |
| 2013/0124762 A1 | 5/2013 | Tamir et al. | |
| 2013/0144731 A1* | 6/2013 | Baldwin et al. | 705/17 |
| 2013/0162527 A1* | 6/2013 | Dahl | 345/156 |
| 2013/0219098 A1 | 8/2013 | Turnpenny et al. | |
| 2013/0262305 A1 | 10/2013 | Jones et al. | |
| 2013/0297844 A1* | 11/2013 | Rosenberg et al. | 710/303 |
| 2014/0295758 A1* | 10/2014 | Pedersen | 455/41.2 |

FOREIGN PATENT DOCUMENTS

| | | |
|---|---|---|
| WO | WO2010069048 | 6/2010 |
| WO | WO-2011126468 | 10/2011 |
| WO | WO-2012018711 | 2/2012 |
| WO | WO2012052895 | 4/2012 |
| WO | WO-2013006973 | 1/2013 |
| WO | WO2013038359 | 3/2013 |
| WO | WO-2013054232 | 4/2013 |
| WO | WO-2013076625 | 5/2013 |
| WO | WO-2013105005 | 7/2013 |
| WO | WO-2013114263 | 8/2013 |
| WO | WO-2013137872 | 9/2013 |
| WO | WO-2013144351 | 10/2013 |
| WO | WO-2013166126 | 11/2013 |

* cited by examiner

SYSTEM AND METHOD FOR MOBILE DEVICE DOCKING STATION

RELATED APPLICATIONS

This application is related to and claims priority from U.S. Provisional Application Ser. No. 61/642,916, filed on May 4, 2012, which is hereby fully incorporated by reference.

TECHNICAL FIELD

Embodiments of the invention are related to systems and methods for a docking station that wirelessly connects to a mobile device, facilitates charging the mobile device, and enables the mobile device to interact with a user's workspace hosted in a virtual desktop infrastructure or cloud computing environment and connects the mobile device to any peripherals attached to the docking station.

BACKGROUND OF THE INVENTION

Many businesses maintain an extensive network of local computers for accessing end user applications and data. Historically these computers have been either laptops or desktops and in some circumstances terminal services on network terminals. With the advent of "Cloud Computing" many large enterprises have started deploying centralized servers that host virtual desktop infrastructure ("VDI") where an employee can remotely access his workspace from a thin client terminal or a local machine, commonly referred to as an "End Point". All the user's programs, applications, processes, and data are run and maintained securely on the VDI servers within the datacenter. Unfortunately, many companies still have to deploy an end point for every user accessing his workspace and it is expensive to purchase and maintain these computers for every employee. Bring Your Own Computer ("BYOC") is a solution many enterprises are investigating to help reduce this expense, however employees are often put-off by lugging a heavy computer to remote locations and dealing with complicated authentication protocols to connect to company servers. Additionally, administrators need to implement complex security measures to ensure their company's network and data are not put at risk by an infected/compromised BYOC computer. Accordingly, a solution is needed that will reduce companies' computing infrastructure costs and improve an employee's experience and access to his workspace.

In recent years, smartphones have changed the face of mobile computing. These devices are now powerful enough to run complex operating systems. Many of these devices support 3G, 4G and LTE cellular radio connections, Wi-Fi, Bluetooth, GPS, near field communication ("NFC"), and digital cameras. Most importantly, the processors in many new smartphones are capable of efficiently running remote connection software to access VDI session(s) and the user's workspace. Tablet computers have many of the same capabilities and features of smartphones but possess larger screens. Together, the smartphone and tablet computer have redefined the meaning of "mobile device." Whilst mobile devices provide almost "anywhere" access to these enterprise services, the user experience is less than optimal due the small screen real estate and lack of physical input devices such as a keyboard and mouse.

Docking stations are well known in the art as means for connecting mobile computers to peripheral devices. A typical docking station has one port that connects directly to a mobile computer. The port allows the transfer of electricity to the mobile computer, powering the computer and charging its battery. Simultaneously, the docking station consolidates the signals from any of its other peripheral ports or connectors and sends them to the mobile computer via the connected port. The mobile computer is then able to access and/or control the peripheral connections and devices. A docking station would seem to be an ideal way to leverage the portability of a mobile device and provide robust functionality. However, there are limitations.

The typical docking station is designed for a laptop computer. Since different laptops have different connectors and power signaling specifications, a docking station is usually designed with a port to accommodate a specific make and model of a laptop computer. This limits the usefulness of the docking station because it cannot accommodate other non-like laptops. Moreover, the laptop must be carefully placed in the docking station to ensure that the laptop and docking station are properly connected.

To be sure, docking stations are available for mobile devices such as smartphones and tablets but have limited functionality as compared to docking stations for laptops. Such docking stations usually provide power to the connected device, but limit connections to only certain other types of peripheral devices (e.g. speakers or headphones). Some docking stations only provide power, but require that the mobile device be plugged into the dock. Other docking stations charge a mobile device's battery via induction, but offer no connections to peripheral devices.

Unfortunately, due to the above-mentioned deficiencies with currently existing systems, a solution is needed to accommodate the ever increasing popularity and functionality of smartphones, tablets, and other mobile computing devices. A solution is needed to allow a docking station to provide interoperability, facilitate greater access to peripheral connections and devices, provide wireless means to charge a mobile device, and enable the mobile device to interact with a user's workspace.

SUMMARY OF THE INVENTION

Docking stations typically refer to devices that physically connect to a computer via hard-wired cables or connectors. In embodiments of this invention, a docking station is a device that can physically and/or wirelessly connect to a computer. The docking station can utilize wireless standards well known in the art to wirelessly connect to the computer, such as NFC, Bluetooth, and Wi-Fi.

In embodiments of the invention, the docking station provides an inductive charging surface with ports for connecting to peripheral devices. The top-surface is a non-slip inductive surface, on which a mobile device may be placed. When a mobile device comes in contact with the inductive surface, the device's battery begins to charge via induction. Concurrently, the device comes within close enough range of the docking station to allow the mobile device and docking station to connect via NFC. The docking station uses NFC to identify and authenticate the mobile device. The docking station may also provide, for example, a biometric sensor that may be used for authenticating the user. The docking station could also implement parental or enterprise controls, to limit functionality for certain mobile devices or users. Once authentication has occurred, the mobile device can access other features. In embodiments of the invention, the mobile device utilizes a variety of ways to wirelessly connect with the docking station. Such ways include connecting via exclusive use of NFC, Bluetooth, or Wi-Fi. Other ways include using each wireless protocol for specific tasks, or concurrently using a combination of protocols.

In embodiments of the invention, the docking station provides display connectors to allow connections to multiple monitors. The monitors can be LCD screens, touchscreens or, alternatively, can be projectors that project the display on a wall or screen or heads-up displays. The docking station also provides data ports to allow connections to other peripheral devices, for example, a mouse, keyboard, printer, or external hard drive. A network connector is also provided to allow a direct connection to the internet or a local area network. Audio jacks are available for external speakers or headphones. There is also a power supply port for powering the docking station, as well as a battery.

In further embodiments of the invention, there are indicator lights and information displays along the chassis of the docking station. They display the status of the wireless connections and the mobile device's battery charge.

In accordance with embodiments of the invention, the docking station can determine if multiple mobile devices are laying on its inductive surface. For example, selector buttons on the docking station allow the user to select which device is the primary device for connecting with the docking station. Any non-selected device would still be able to charge its battery due to the inductive surface of the docking station.

In embodiments of the invention, the docking station includes a power button for turning on and off the docking station. It may also include an additional port that only supplies power for the charging of a mobile device. Such a port would be necessary for a mobile device that does not support inductive charging.

In further embodiments of the invention, the docking station includes an internal processor that facilitates the connection of the mobile device to a VDI environment. After authenticating the mobile device and the user, it provides the authenticated credentials to the remote server. A secure connection is created and the user may interact with the VDI using the mobile device, the docking station, and any connected peripheral devices.

In one aspect of the invention, a docking station for a mobile device is provided comprising an inductive surface for charging the mobile device's battery. The inductive surface is inclined with a raised lip at the edge of its lower side. The docking station has an authentication interface for authenticating the mobile device. There's a radio antenna for wirelessly transferring data to and from the mobile device and connection ports for connecting the mobile device to peripheral devices, network connections, and internet connections. The docking station supplies a selection interface for selecting the primary mobile device to wirelessly connect to the docking station and a display for showing the status of the wireless connection between the docking station and the primary mobile device, the battery charge status of the primary mobile device, and the status of the docking station's internet or network connection. The docking station has a processor for facilitating the connection of peripheral devices to the primary mobile device. A keyboard slides out from a storage compartment underneath the inductive surface. A retractable multi-pronged retractable connector cord is available to directly connect the docking station to the mobile device. The AC power supply powers the docking station and supplies power to the one or more mobile devices laying on the inductive surface. A battery is also available for providing a DC power supply for powering the docking station and supplying power to the one or more mobile devices laying on the inductive surface. Lastly, the docking station has a monitor or projector for displaying the primary mobile device's screen.

In another aspect of the invention, a method for establishing and maintaining a wireless connection between a docking station and a mobile device and charging the mobile device is provided. The method includes providing an inclined inductive surface with a non-slip texture for charging the mobile device, using a radio antenna to detect the mobile device, and establishing a connection with the mobile device using the radio antenna via cellular radio, Wi-Fi, Bluetooth, or near field communication. The method also includes authenticating the mobile device using a biometric sensor and communicating with a computer via the internet or network connection and connecting via the radio antenna the mobile device to peripheral devices, network connections, and internet connections. The method comprises providing a selection interface for selecting a primary mobile device to wirelessly connect to the docking station and displaying the status of the wireless connection between the docking station and the primary mobile device, the battery charge status of the primary mobile device, and the status of the docking station's internet or network connection. The method further includes providing a keyboard for input into the mobile device and providing a retractable connector cord to directly connect the docking station to the mobile device. The method also comprises supplying power to one or more mobile devices laying on the inductive surface and displaying the primary mobile device's screen.

In a further embodiment of the invention, a computer-implemented method for establishing a connection between a docking station and a mobile device and authenticating the mobile device and its user is provided. The method includes detecting a mobile device, accepting user input to select a primary mobile device, and implementing computer processing components for performing steps. Those steps include determining whether more than one mobile device is detected and selecting a default primary mobile device, facilitating the wireless connection to the primary mobile device by controlling the radio antenna to communicate with the primary mobile device, and querying the user for authentication input. The steps further include accepting user input and authenticating the user by analyzing the user's input to a biometric sensor and controlling a network adapter to communicate with a remote computer, facilitating the connection to a virtual interface via a network connection by controlling the network adapter to communicate with the remote computer.

BRIEF DESCRIPTION OF THE DRAWINGS

The present invention is described in detail below with reference to the attached drawings figures, wherein.

DETAILED DESCRIPTION OF PREFERRED EMBODIMENTS

Embodiments of the present invention are directed to a method and system for charging a mobile device, connecting the mobile device to peripheral devices and connections, and providing access for the mobile device to a virtual environment hosted by a remote computer. The system reduces the need for standalone desktop computers and facilitates the use of mobile devices for everyday computing tasks.

Figure 1:
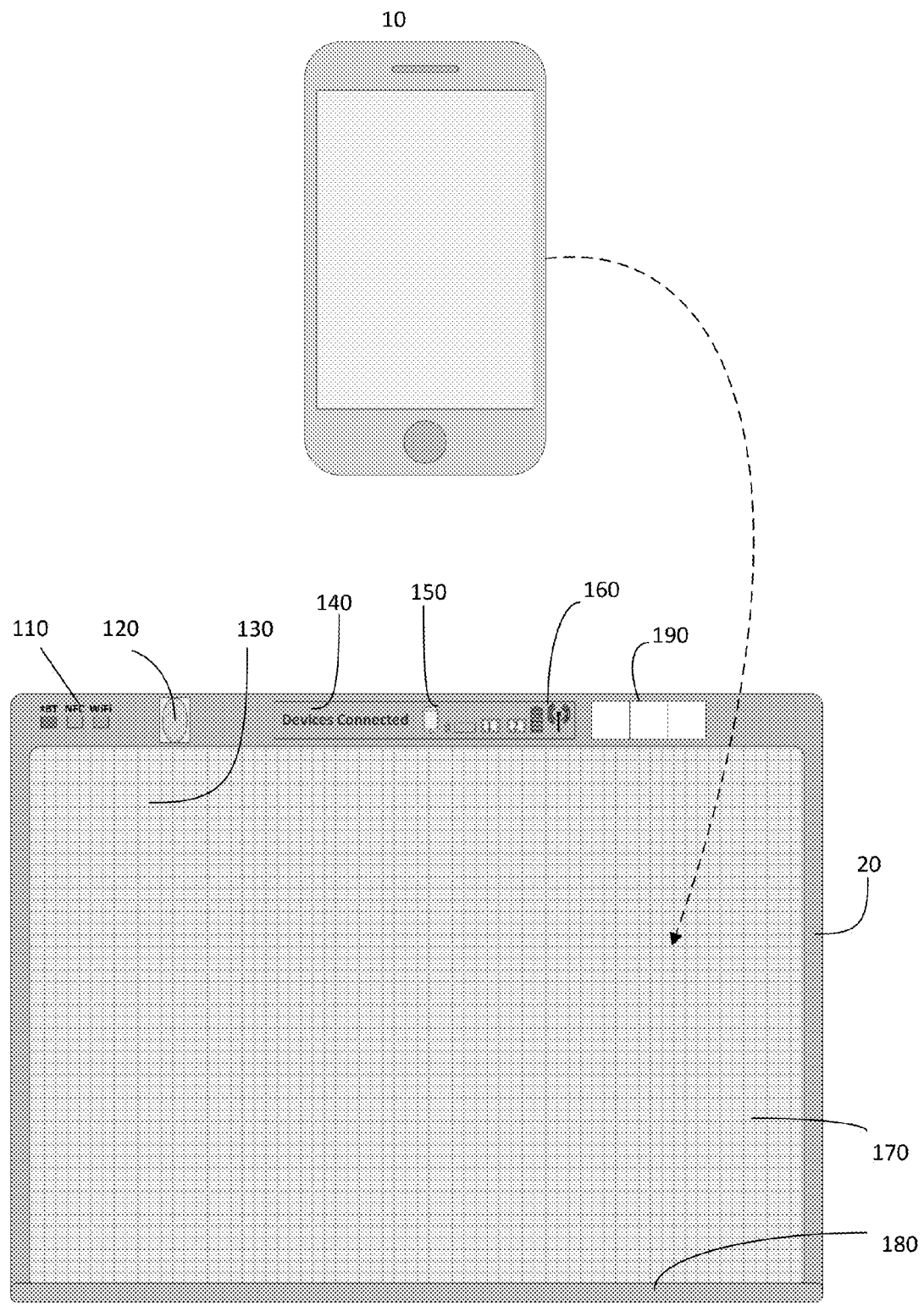
FIG. 1 is a schematic diagram of a docking station for a mobile device according to an embodiment of the present invention.

FIG. 1 is a schematic diagram of a docking station 20 according to an embodiment of the present invention. Mobile device 10 is a mobile computer. Such mobile computers include, for example, smartphones, tablets, laptops, PDAs, ultrabooks, netbooks, as well as other portable computing devices. The mobile device 10 may support 3G and 4G cellular radio connections, Wi-Fi, Bluetooth, GPS, near field communication ("NFC"), and compact digital cameras.

The docking station 20 has a housing that comprises an inductive surface 130, connection status indicator 110, a biometric sensor 120, a status display 140, a connected devices indicator 150, a Wi-Fi and battery indicator 160, a non-slip texture 170, a stop-lip 180, and a solar panel 190.

When the mobile device 10 is placed on the inductive surface 130, the mobile device's battery starts to charge via induction. The inductive surface 130 can be flat or inclined. The inductive surface 130 has a non-slip texture 170 that decreases the ability of the mobile device 10 to slide across the surface. The non-slip texture 170 can be effectuated by using non-slip materials well known in the art, like rubber, as well as implementing a roughened, texturized surface. Stop-lip 180 lays at the bottom edge of the inclined inductive surface 130 to ensure that mobile device 10 does not fall off the docking station 20. The stop-lip 180 can extend all around the border of the inductive surface 130 to ensure that mobile device 10 stays on the docking station 20. In some embodiments, the inductive surface 130 is inclined to the point of being vertical and the mobile device 10 stands on stop-lip 180, which ensures that the mobile device 20 is close enough to the inductive surface 170 to facilitate induction.

The biometric sensor 120 can be a fingerprint reader, camera, iris scanner, microphone, or any other device known in the art for biometric identification. After a user submits input via the biometric sensor 120, the docking station 20 then implements voice recognition, fingerprint, face recognition, DNA matching, typing rhythm, or other biometric algorithms for authenticating the user.

In alternative embodiments, the biometric sensor 120 can include a smart token reader. The sensor can read disconnected tokens, connected tokens, smart cards, contactless tokens that utilize RFID and NFC protocols, Bluetooth tokens, GSM cellular tokens, or utilize any other security token technology well known in the art. The docking station can authenticate the user only using biometric or smart token input, or using biometric and smart token input in tandem. In this way, the docking station 20 can provide multiple levels of authentication and provide greater security.

Figure 4:
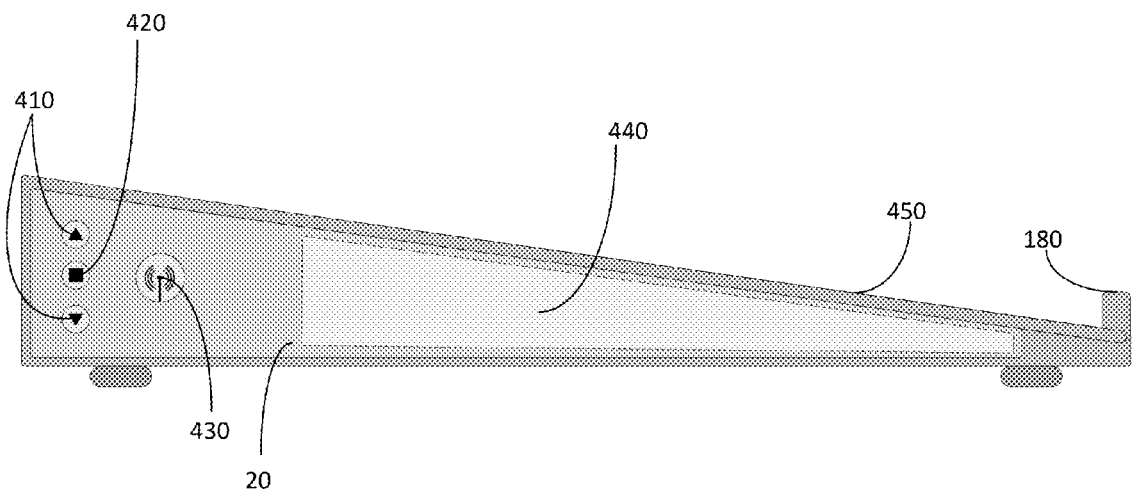
FIG. 4 is a schematic diagram of a docking station according to an embodiment of the present invention showing a storage compartment under the inclined inductive surface.

The connection status indicator 110 can be a series of LED lights or an LCD panel that indicates the type of wireless connection that the mobile device 10 currently has with the docking station 20. The status display 140 may be an LCD display that includes the connected devices indicator 150 and the Wi-Fi and battery indicator 160. The connected devices indicator 150 shows which mobile device 10 is primary. When more than one mobile device is placed on the inductive surface 130, each is able to charge its battery through induction, but only one is recognized as primary by the docking station 20. Refer to FIG. 4 and the related description for more discussion on selecting a primary device. The Wi-Fi and battery indicator 160 shows the strength of the docking station 20's Wi-Fi connection to a network and the battery life status of any mobile device laying on the inductive surface 130. Also contemplated, the status display 140 can show any relevant statuses concerning mobile device 10 or docking station 20, such as peripheral devices connected, system resources status, and power consumption.

The solar panel 190 can provide an ecologically friendly way to generate and supply power to the docking station. In embodiments, the power provided by the solar panel 190 could be used to charge a battery for the docking station, the mobile device's battery, or power the status indicator 110, the biometric sensor 120, the status display 140, the connected devices indicator 150, and the Wi-Fi and battery indicator 160. The solar panel 190 could include any other interface well known in the art for generating "green" energy, including devices for harvesting wind power, hand crank generators, and pedal-driven generators.

Figure 2:
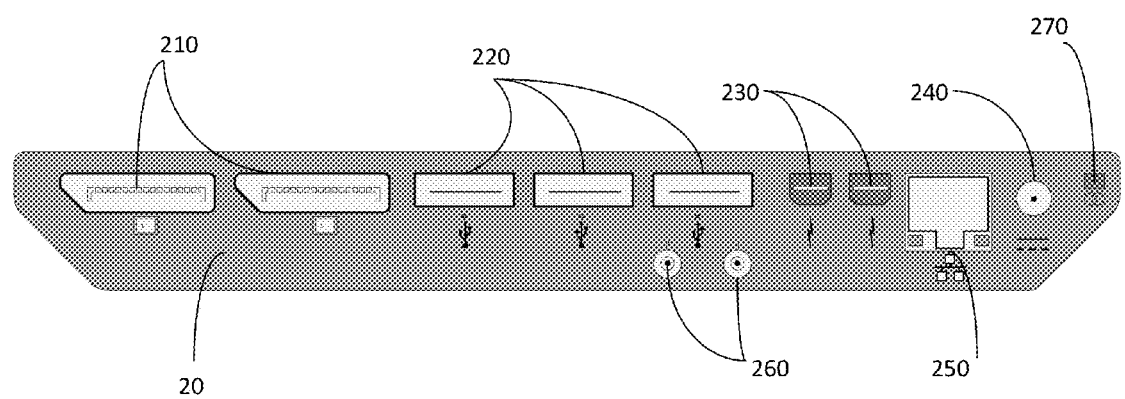
FIG. 2 is a schematic diagram of a docking station for a mobile device according to an embodiment of the present invention where the connection ports are provided.

FIG. 2 is a schematic diagram of a docking station according to an embodiment of the present invention where the connection ports are provided. The ports include display connectors 210, high-speed data ports 220, audio jacks 260, Thunderbolt ports 230, a network port 250, and a power port 240. This is but one of an uncountable number of embodiments that provide ports in different combinations for connection to peripheral devices. For instance the display connectors 210 and Thunderbolt ports 230 can include VGA ports, DVI ports, RCA ports, HDMI ports, Thunderbolt ports, or any other port capable of handling video signals. The audio jacks 260 can include TRS ports, RCA ports, HDMI ports, microphone ports, or any other port capable of handling audio signals. The high-speed data ports 220 can include USB ports, Firewire ports, MIDI ports, SATA ports, or any other port capable of handling high-speed data transfers. The docking station could also incorporate a built-in microphone and speaker. The network port 250 can include an Ethernet port, a modem port, a WiFI antenna, a cellular antenna, a Bluetooth antenna, an NFC antenna, and any other port or antenna capable of connecting to a network or the internet. The network port 250 can also include a GPS receiver.

The power port 240 includes any AC power port. It could also include a power over Ethernet port ("PoE") so that the docking station could receive power and connect to a network, such as a LAN, or the internet through the same port. An alternative embodiment contemplates including a battery that provides DC power to the docking station 20. In all embodiments the power supply could power the docking station and the one or more mobile devices laying on the inductive surface 130. A lock 270 provides an apparatus for securing a lock to the docking station 20 so that it can be locked down to a particular physical location.

Figure 3:
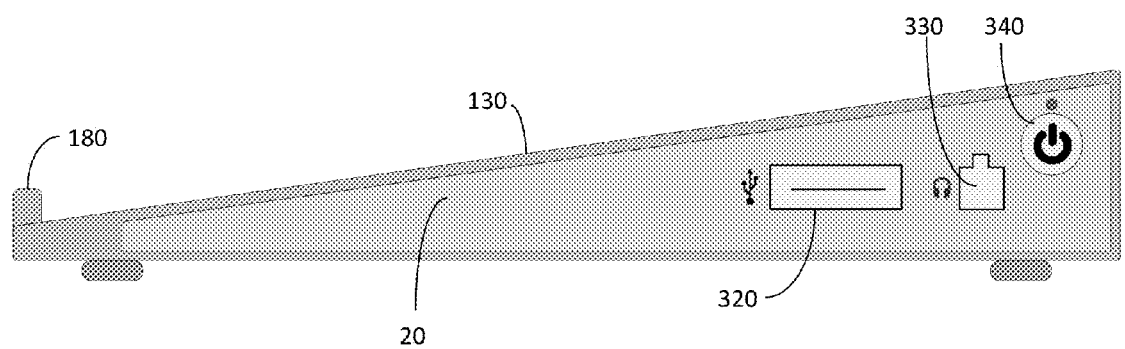
FIG. 3 is a schematic diagram of a docking station according to an embodiment of the present invention showing the inclined inductive surface and connector ports.

FIG. 3 is a schematic diagram of a docking station according to an embodiment of the present invention showing the inclined inductive surface 130 as well as other connector ports. A connector port 320 provides power to the mobile device 10 if directly connected by a cable. Such a port is necessary if mobile device 10 is not capable of charging its battery via induction. In another embodiment, a multi-pronged retractable connector is hardwired in place of the port 320. A headphone jack 330 is included. A power button 340 is included to allow a user to turn the docking station 20 on and off. As can be seen in FIG. 3, the stop-lip 180 is at the bottom edge of the inclined inductive surface 130 to ensure the mobile device 10 stays on the docking station 20.

FIG. 4 is a schematic diagram of a docking station according to an embodiment of the present invention showing a storage compartment 440 under the inclined inductive surface 130. A storage lid 450 can be used to access the storage compartment 440. The lid can be part of the inductive surface 130, or may be under the inductive surface and accessible by removing the non-slip texture 170. In one embodiment, an electronically connected keyboard slides out of the storage compartment 440. The cycle control 410 allows the user to cycle through multiple mobile devices 10 on the inductive surface 130 to select a primary mobile device. The display status display 140 shows the user the current primary mobile device and cycles through to show the other potential mobile devices when the cycle control 410 is activated. The selector 420 selects the currently shown device on the status display 140 as the primary mobile device. The primary mobile device is then able to access the peripheral devices and connections via the docking station 20. The sync button 430 forces the docking station 20 to initiate or reset its wireless connections with the mobile devices 10 on the inductive surface 130. By default, the docking station selects the primary mobile device based on which device it connects to first.

Other embodiments of the docking station 20 include a built-in monitor that is an LCD screen or a touch screen that displays the primary mobile device's screen. Such a monitor would decrease the need for display connector ports. In another embodiment, the docking station includes a projector that displays the primary mobile device's screen on a wall or screen. The projector could be a hologram generator that displays a virtual environment. The hologram experience could provide a three dimensional ("3-D") real-time experience where the user interacts with the hologram. The operation of such a system to produce 3-D holograms is currently known in the art and is disclosed more fully, for example in "Real-Time holographic video images with commodity PC hardware" by Bove, Michael V. Jr., Wendy J. Plesniak, Tyeler Quentmeyer, and James Barabas, in Proc SPIE, 5664, 255 (2005). Other known holography techniques may alternatively be implemented.

In other embodiments, the docking station may be controlled through voice commands. A user could speak into a built-in microphone to select the primary mobile device and control how the primary mobile device interacts with the peripheral devices. The user could also use voice commands for navigating the mobile device's user environment or for inputting information.

Similarly, in another embodiment, the docking station can be used facilitate the telephone operations of the primary mobile device. When the primary mobile device wirelessly connects with the docking station, the user may use the built-in microphone and speaker to make and receive phone calls. In other embodiments, the user could use a headset to make phone calls that plugs into the docking station via a headset jack or USB port, or that wirelessly connects to the docking station via Bluetooth.

The docking station 20 could also provide a heads-up display (HUD) for a vehicle, including a car or airplane, or HUD goggles or glasses. In one embodiment, the HUD in the car would present information that is helpful to the driver, like a map or list of traffic conditions. The docking station can also restrict access to functions like making phone calls or texting while the car is in motion.

In alternative embodiments, the docking station can be used to control the functionality of the car or vehicle. The docking station wirelessly connects to the car when the mobile device is placed on its surface. The docking station authenticates the car and the mobile device, which allows the user to start the car by inputting commands into the mobile device. Before allowing the user to control the car via the mobile device, the docking station can authenticate the user by making the user use a smart token, enter a password, or enter other similar authentication input. The user can then control all aspects of the vehicle, including the radio, power windows and locks, heating and cooling systems, seat controls, interior lights, headlights, windshield wipers, accelerator, brakes, GPS, steering wheel, gear shift, as well as other controls and devices known in the art.

In other embodiments, the docking station could use its built-in GPS receiver to limit its functionality based on the physical locality of the docking station. The docking station could also use assisted GPS ("A-GPS") to determine its location by utilizing its radio antenna and network and internet connections. The docking station could also communicate with the primary mobile device's GPS receiver to determine its location. Furthermore, in embodiments where the docking station is in a car or vehicle, it connects to the car when the car is turned on and uses the GPS receiver to determine if the car is in transit and whether an approved mobile device is connected to the docking station. If an approved mobile device is not detected, it sends a text, email, phone call, tweet, or other notification to the approved mobile device or other designated device that discloses the car's location, speed, direction, trajectory, or other location based information. In other embodiments, the docking station initiates a homing beacon or other tracking protocols when the mobile device is not detected.

Further embodiments include docking stations of different sizes. For instance, a docking station intended for travel may be smaller, offer less inductive surface area and fewer connector ports, but may include a battery. A docking station intended for home-use or enterprise-use may offer an inductive surface area capable of holding multiple mobile devices at one time, more connector ports, a slide-out keyboard with a touchpad or pointing stick mouse, and an attached monitor.

In all embodiments, the docking station is agnostic to the type and make of the mobile device. The mobile device connects to the docking station using internationally recognized wireless standards. The docking station could detect the operating system that mobile device is using and optimize its wireless connections to the device based on this information. The docking station would allow the same functionality for the mobile device regardless of the operating system type and version or any other software loaded on the mobile device.

Figure 5:
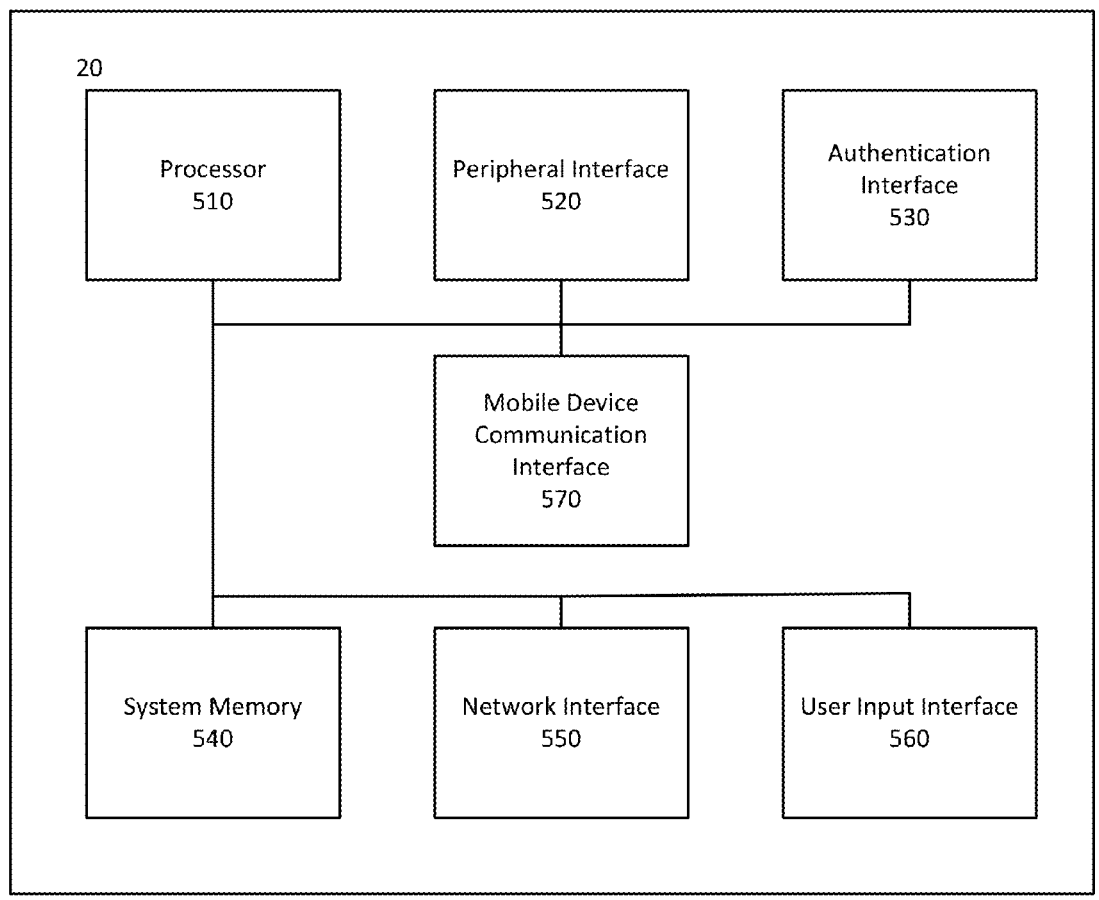
FIG. 5 is a block diagram illustrating the processing components of a docking station in accordance with an embodiment of the invention.

FIG. 5 is a block diagram illustrating the processing components of a docking station in accordance with an embodiment of the invention. A processor 510 is necessary for facilitating the connection of the mobile device 10 to the docking station 20. Through the peripheral interface 520 and the mobile device communication interface 570 it connects the peripheral devices to the mobile device 10. It processes information from the authentication interface 530, such as biometric sensor 120, and communicates via the network interface 550 with a remote computer to determine whether the user of the mobile device 10 and docking station 20 is authorized to access a virtual environment provided by the remote computer. The processor accepts input from the user through the user input interface 560 and facilitates the selection of the primary mobile device. The system memory 540 stores biometric information for authorizing users and information regarding user or system preferences. For instance, it may store device restriction, parental control, or enterprise control information regarding a certain mobile device so that it can never be selected as the primary mobile device or so that it is restricted from accessing peripheral devices, the internet, or network services.

The system memory 540 may include computer storage media in the form of volatile and/or nonvolatile memory such as read only memory ("ROM") and random access memory ("RAM"). The network interface 550 facilitates the communication of data from the docking station 20 on a network.

The processing components of the docking station 20 may be in the form of a "processing machine," i.e. a tangibly embodied machine, such as a general purpose computer or a special purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as any of the processing as described herein. Such a set of instructions for performing a particular task may be characterized as a program, software program, or simply software.

As noted above, the processing machine, which may be constituted, for example, by the particular system and/or systems described above, executes the instructions that are stored in the memory or memories to process data. This processing of data may be in response to commands by a user or users of the processing machine, in response to previous processing, in response to a request by another processing machine and/or any other input, for example. As noted above, the processing machine used to implement the invention may be a general purpose computer. However, the processing machine described above may also utilize (or be in the form of) any of a wide variety of other technologies including a special purpose computer, a computer system including a microcomputer, mini-computer or mainframe for example, a programmed microprocessor, a micro-controller, a peripheral integrated circuit element, a CSIC (Consumer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Apple OS X™ operating system, the Apache operating system, an OpenStep™ operating system, the Android™ operating system, the Apple iOS™ operating system, or another operating system or platform.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, RUM Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Figure 6:
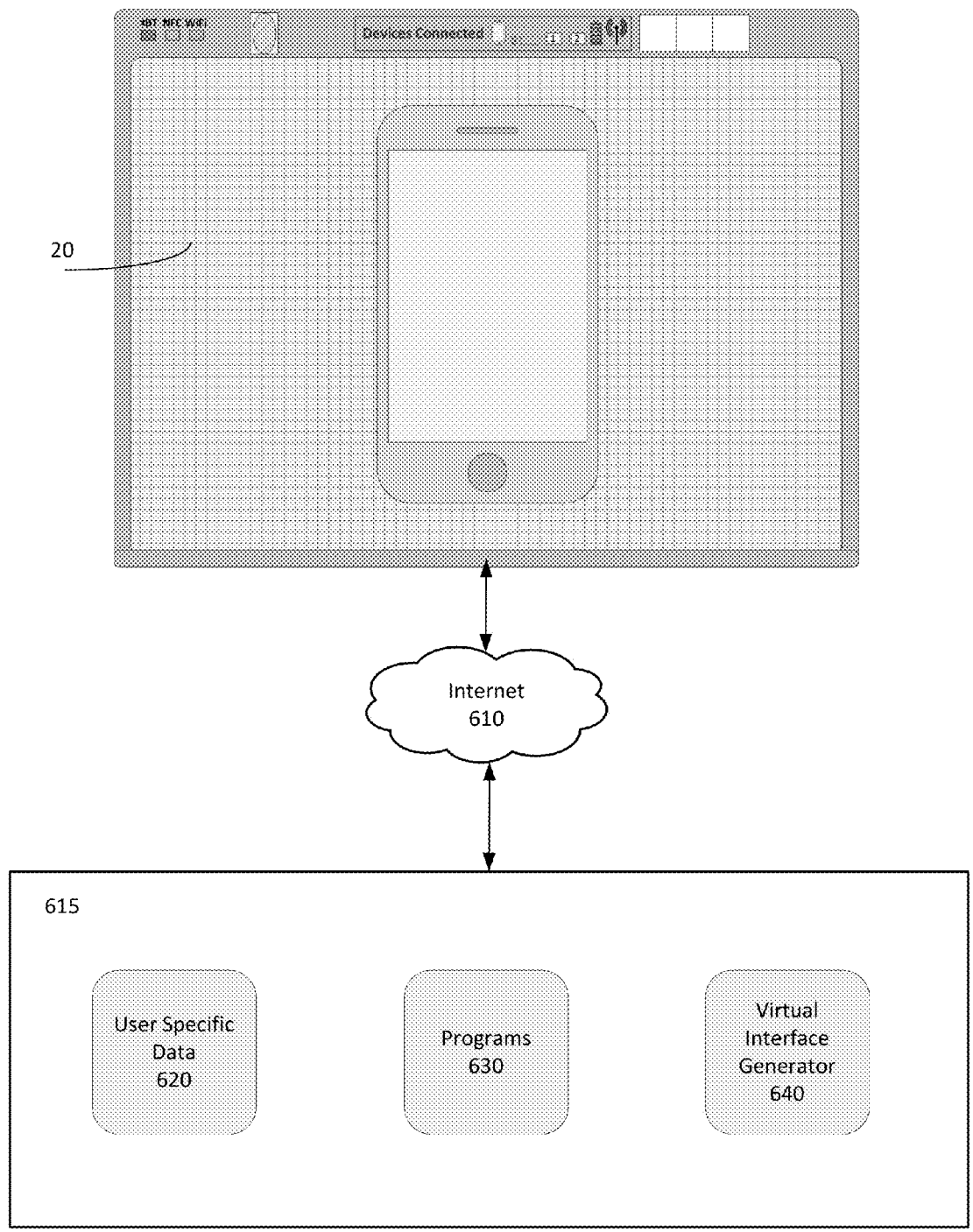
FIG. 6 is a block diagram illustrating how a mobile device may use the docking station to communicate with a remote computer to employ a virtual desktop interface in accordance with an embodiment of the invention.

In embodiments, the docking station acts as a gateway to the cloud. FIG. 6 is a block diagram illustrating how a mobile device 10 may use the docking station 20 to communicate with a remote computer 615 to employ a VDI in accordance with an embodiment of the invention. In FIG. 6, the mobile device 10 is able to access the VDI created by the virtual interface generator 604 via its connection to the docking station 20. The docking station 20 authenticates the user and mobile device 10 using onboard logic and communicating with the remote computer 615 via the internet 610. The user is then able to access the user specific data 620 and programs 630 hosted by the remote computer 615.

In additional embodiments, the communication may be over a wireless local area network (LAN), a wide area network (WAN), wireless personal area network (PAN) and other types of networks such as the internet. Some suitable communications protocols may include TCP/IP, UDP, or OSI for example.

Figure 7:
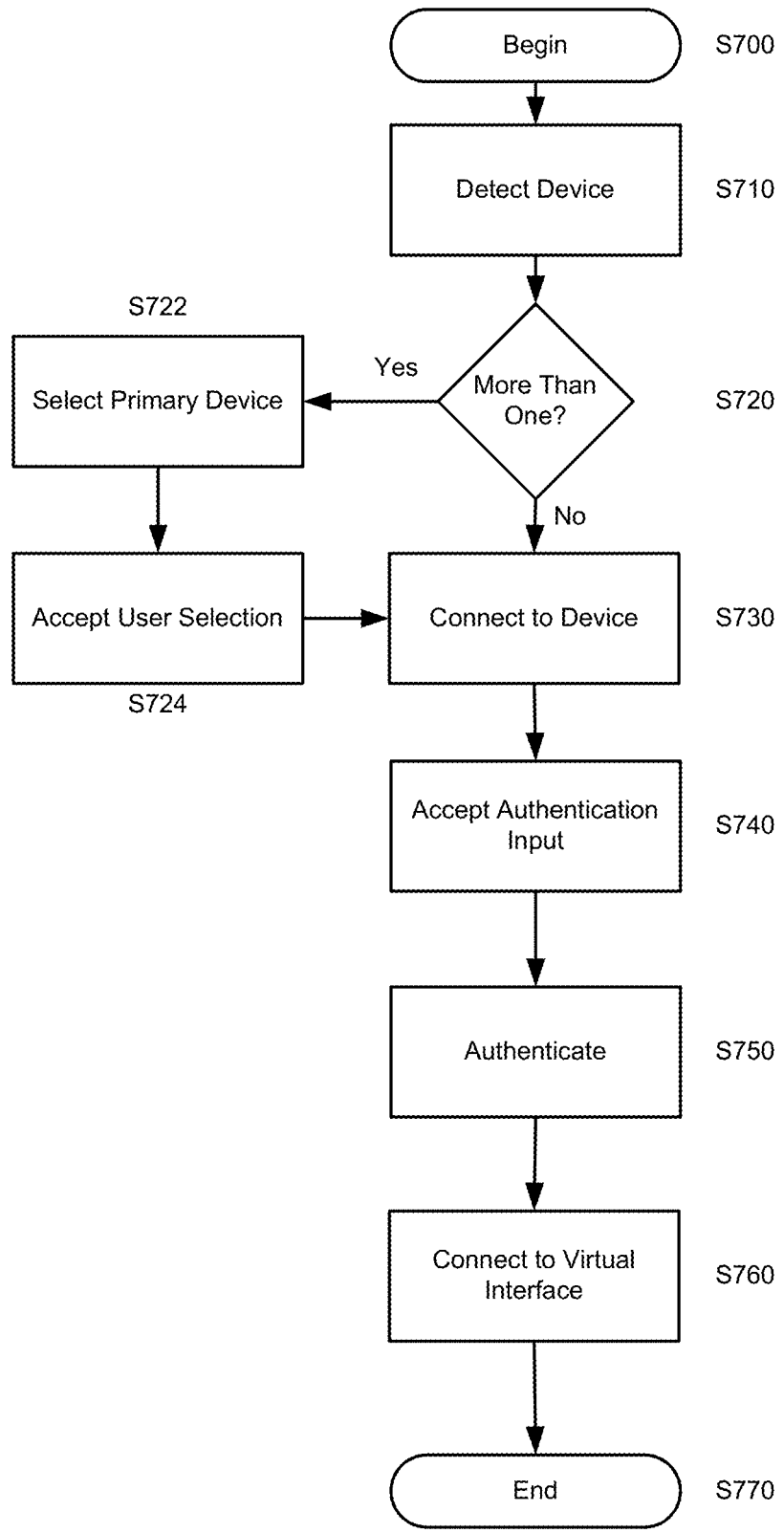
FIG. 7 is a work flow diagram illustrating user and mobile device authentication in accordance with an embodiment of the invention.

FIG. 7 is a work flow diagram illustrating user and mobile device authentication in accordance with an embodiment of the invention. The method begins in S700 and in S710, the docking station detects a mobile device. In S720 the docking station determines whether more than one devices is placed in the docking station. If so, the docking station selects one of the mobile devices to be the primary mobile device in S722. Otherwise, the docking station skips to S730. The docking station typically selects the primary mobile device based on the time in which the mobile devices were placed on the docking station. In S724 the user may select a primary mobile device. In S730 the docking station wirelessly connects the primary mobile device to the peripheral devices and connections. In S740 the docking station accepts input from the user for authentication. A biometric sensor can accept as input a user's voice, fingerprint, face contours, DNA, typing rhythm, or other biometric identifiers. A keyboard can also be used to enter information like a password. In S750 the docking station authenticates the user input. Besides analyzing biometric input, standard authentication procedures also can be used, such as password, personal identification number, knowledge-based, or public-key encryption systems. The docking station also can connect to a remote computer via the internet or a network connection to facilitate the authentication process. For instance, the user may enter a password to the docking station but the processing of the password occurs at the remote computer. After authentication, the remote computer in S760 initiates a VDI session and delivers a virtual environment to the docking station.

In other embodiments, when a mobile device is placed in the docking station the docking station determines whether it is connected, directly or wirelessly, to an authenticated network. If so, the docking station could bypass any authenticating procedures and connect to a remote computer and receive a VDI session. Similarly, if the docking station recognizes the network as insecure or vulnerable, it could limit its functionality or the mobile device's access to peripheral devices to prevent potential data loss. The docking station can initiate different policies for allowing and restricting access to peripheral devices, the network, and internet based on the status of its connections, the identification of the mobile device, and the authentication of the docking station user.

In alternative embodiments, an additional factor of authentication can be provided. For example, the remote computer can authenticate that the docking station is an approved docking station, as well as authenticate that the mobile device is an approved device and the user is an approved user. The docking station can provide different levels of access based on these varying tiers of authentication and in combination with parental controls, enterprise level controls, or location based controls. This multi-focused authorization can occur sequentially or at the same time. Moreover, the remote computer that authorizes the docking station and mobile device could be separate and distinct from the remote computer that provides a VDI session for the docking station and mobile device.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A docking station for a mobile device, the docking station providing access for the mobile device to a virtual desktop interactive environment hosted by a remote computer, the docking station comprising:
   an inductive surface for charging the mobile device;
   an authentication interface for authenticating the mobile device to enable interaction between the mobile device, the docking station, and the remote computer;
   a processor receiving, upon successful authentication of the mobile device through the authentication interface, the virtual desktop interactive environment from the remote computer and enabling display of the virtual desktop interactive environment on the mobile device;

a radio antenna for detecting the mobile device and upon detection by the radio antenna, wirelessly transferring data to and from the mobile device; and a connection interface for providing access to peripheral devices.

2. The docking station of claim 1, wherein the inductive surface is inclined and has a non-slip texture.

3. The docking station of claim 2 further comprising a raised lip at the edge of the lower side of the inclined inductive surface.

4. The docking station of claim 3, wherein the radio antenna supports cellular radio connections, Wi-Fi, Bluetooth, and near field communication.

5. The docking station of claim 4, wherein the authentication interface comprises a biometric sensor.

6. The docking station of claim 5, wherein the connection interface further comprises connection ports for peripheral devices, network connections, and internet connections for interaction with the mobile device.

7. The docking station of claim 6, wherein the inductive surface has a large surface area capable of accommodating more than one mobile device laying on its surface wherein:

the docking station further comprises a selection interface for selecting a primary mobile device to wirelessly connect to the docking station.

8. The docking station of claim 7, wherein the docking station wirelessly connects to the primary mobile device via the radio antenna.

9. The docking station of claim 8, wherein the docking station further comprises a display showing the status of the wireless connection between the docking station and the primary mobile device, the battery charge status of the primary mobile device, and the status of the docking station's internet or network connection.

10. The docking station of claim 9 further comprising a storage compartment underneath the inductive surface.

11. The docking station of 9, wherein the processor facilitates the connection of peripheral devices to the primary mobile device.

12. The docking station of claim 11, wherein the processor facilitates the authentication of the primary mobile device by communicating with an outside computer via the internet or a network connection.

13. The docking station of claim 12, wherein the processor further provides parental controls or enterprise controls by restricting access to peripheral devices, the internet, or network services based on the identity of the primary mobile device.

14. The docking station of claim 12 further comprising a keyboard that slides out from the storage compartment, wherein the keyboard includes a touchpad mouse.

15. The docking station of claim 12 further comprising a retractable multi-pronged connector cord to directly connect the docking station to the mobile device.

16. The docking station of claim 12 further comprising an AC power supply for powering the docking station and supplying power to the one or more mobile devices laying on the inductive surface.

17. The docking station of claim 16 further comprising a battery for providing a DC power supply for powering the docking station and supplying power to the one or more mobile devices laying on the inductive surface.

18. The docking station of claim 17 further comprising a LAN interface providing POE for powering the docking station and supplying power to the one or more mobile devices laying on the inductive surface.

19. The docking station of claim 18 further comprising a solar panel for supplying power to the docking station and to the one or more mobile devices laying on the inductive surface.

20. A method for establishing and maintaining a wireless connection between a docking station and a mobile device and charging the mobile device, the docking station providing access for the mobile device to a virtual desktop interactive environment hosted by a remote computer, the method comprising:

providing an inductive surface for charging the mobile device;

using a radio antenna to detect the mobile device;

upon detection by the radio antenna, establishing a connection with the mobile device using the radio antenna;

authenticating the mobile device using an authentication interface, thereby enabling interaction between the mobile device, the docking station, and the remote computer;

receiving, upon successful authentication, at a processor of the mobile device through the authentication interface, the virtual desktop interactive environment from the remote computer and enabling display of the virtual desktop interactive environment on the mobile device; and connecting via the radio antenna the mobile device to peripheral devices, network connections, and internet connections.

21. The method of claim 20, further comprising authenticating the docking station.

22. The method of claim 21 wherein the step of establishing a connection includes using cellular radio, Wi-Fi, Bluetooth, or near field communication.

23. The method of claim 22 wherein the step of authenticating includes using a biometric sensor.

24. The method of claim 23 wherein the step of providing an inductive surface includes providing an inclined inductive surface with a non-slip texture.

25. The method of claim 24 further comprising providing a selection interface for selecting a primary mobile device to wirelessly connect to the docking station.

26. The method of claim 25 further comprising displaying the status of the wireless connection between the docking station and the primary mobile device, the battery charge status of the primary mobile device, and the status of the docking station's internet or network connection.

27. The method of claim 26 wherein the step of authenticating includes communicating with a computer via the internet or network connection.

28. The method of claim 27 further comprising providing a keyboard for input into the mobile device.

29. The method of claim 28 further comprising providing a retractable connector cord to directly connect the docking station to the mobile device.

30. The method of claim 29 further comprising supplying power to one or more mobile devices laying on the inductive surface.

31. A computer-implemented method for establishing a connection between a docking station and a mobile device and authenticating the mobile device and its user, the docking station providing access for the mobile device to a virtual desktop interactive environment hosted by a remote computer, the method comprising:

detecting a mobile device;

accepting user input to select a primary mobile device;

implementing computer processing components for performing steps including:

determining whether more than one mobile device is detected and selecting a default primary mobile device;

facilitating the wireless connection to the primary mobile device;

querying the user for authentication input;

accepting user input and authenticating the user using an authentication interface, thereby enabling interaction between the mobile device, the docking station, and the remote computer; and receiving, upon successful authentication of the mobile device through the authentication interface, at a processor of the docking station, the virtual desktop interactive environment from the remote computer, and enabling display of the virtual desktop interactive environment on the mobile device, thereby facilitating the connection to the virtual desktop interactive environment via a network connection.

32. The method of claim 31, wherein the network is a local area network, a wide area network, the internet, and combinations thereof.

33. The method of claim 32, wherein detecting a mobile device includes using a radio antenna that supports cellular radio, Wi-Fi, Bluetooth, and near field communication.

34. The method of claim 33, wherein facilitating the wireless connection includes the computer processing components controlling the radio antenna to communicate with the primary mobile device.

35. The method of claim 34, wherein accepting user input and authenticating the user includes the computer processing components analyzing the user's input to a biometric sensor.

36. The method of claim 35, wherein accepting user input and authenticating the user includes the computer processing components controlling a network adapter to communicate with a remote computer.

37. The method of claim 36, wherein facilitating the connection to a virtual interface via a network connection includes the computer processing components controlling the network adapter to communicate with the remote computer.

* * * * *